(12) United States Patent
Charmet (10) Patent No.: US 10,298,959 B2
(45) Date of Patent: May 21, 2019

(54) METHOD FOR MODIFYING A BINARY VIDEO STREAM

(71) Applicant: SAGEMCOM BROADBAND SAS, Rueil Malmaison (FR)

(72) Inventor: Denis Charmet, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 134 days.

(21) Appl. No.: 15/122,499

(22) PCT Filed: Mar. 2, 2015

(86) PCT No.: PCT/EP2015/054323
§ 371 (c)(1),
(2) Date: Aug. 30, 2016

(87) PCT Pub. No.: WO2015/132209
PCT Pub. Date: Sep. 11, 2015

(65) Prior Publication Data
US 2017/0078704 A1    Mar. 16, 2017

(30) Foreign Application Priority Data
Mar. 4, 2014 (FR) ..................... 14 51723

(51) Int. Cl.
*H04N 19/82* (2014.01)
*H04N 19/176* (2014.01)
(Continued)

(52) U.S. Cl.
CPC ........... *H04N 19/82* (2014.11); *H04N 19/117* (2014.11); *H04N 19/156* (2014.11); *H04N 19/176* (2014.11); *H04N 19/70* (2014.11)

(58) Field of Classification Search
CPC ...... H04N 19/82; H04N 19/70; H04N 19/176; H04N 19/156; H04N 19/117
(Continued)

(56) References Cited

U.S. PATENT DOCUMENTS

2008/0137752 A1    6/2008  He
2009/0304085 A1   12/2009  Avadhanam et al.
(Continued)

FOREIGN PATENT DOCUMENTS

WO    WO 2008/033595    3/2008

OTHER PUBLICATIONS

Joo et al., "Fast Sample Adaptive Offset Encoding Algorithm for HEVC Based on Intra Prediction Mode", 2013 IEEE Third International Conference on Consumer Electronics, Sep. 9, 2013, pp. 50-53.
(Continued)

*Primary Examiner* — Zaihan Jiang
(74) *Attorney, Agent, or Firm* — Nixon & Vanderhye P.C.

(57) ABSTRACT

The present invention relates to a method for modifying a binary video stream encoded according to a video coding algorithm comprising a prediction loop and in-loop post-filtering integrated in the prediction loop. The method comprises the following steps performed by a device: seeking a syntax element relating to the in-loop post-filtering in the binary video stream, the syntax element being used by a decoding device for controlling a complexity of implementation of the in-loop post-filtering; modifying (321, 323, 325) a value of the syntax element or eliminating (321, 323, 325) the syntax element.

11 Claims, 8 Drawing Sheets

(51) Int. Cl.
*H04N 19/70* (2014.01)
*H04N 19/117* (2014.01)
*H04N 19/156* (2014.01)

(58) Field of Classification Search
USPC .................................................. 375/240.12
See application file for complete search history.

(56) References Cited

U.S. PATENT DOCUMENTS

| | | | | |
|---|---|---|---|---|
| 2010/0158103 | A1* | 6/2010 | Ye | H04N 19/176 375/240.02 |
| 2011/0002395 | A1* | 1/2011 | Nishihara | H04N 19/117 375/240.24 |
| 2012/0044991 | A1* | 2/2012 | Mochizuki | H04N 19/46 375/240.12 |
| 2013/0101024 | A1* | 4/2013 | Van der Auwera | H04N 19/117 375/240.03 |
| 2013/0142251 | A1* | 6/2013 | Maani | H04N 19/70 375/240.03 |
| 2013/0194384 | A1* | 8/2013 | Hannuksela | H04N 19/597 348/43 |
| 2013/0336382 | A1* | 12/2013 | Sole Rojals | H04N 19/70 375/240.02 |
| 2014/0036991 | A1* | 2/2014 | Chao | H04N 19/82 375/240.02 |
| 2014/0036998 | A1* | 2/2014 | Narroschke | H04N 19/176 375/240.03 |
| 2014/0098851 | A1* | 4/2014 | Chen | H04N 19/46 375/240.02 |
| 2014/0153636 | A1* | 6/2014 | Esenlik | H04N 19/176 375/240.02 |
| 2014/0192892 | A1* | 7/2014 | Van der Auwera | H04N 19/176 375/240.24 |
| 2014/0301487 | A1* | 10/2014 | Laroche | H04N 19/176 375/240.29 |
| 2015/0016551 | A1* | 1/2015 | Esenlik | H04N 19/117 375/240.29 |
| 2015/0215617 | A1* | 7/2015 | Leontaris | H04N 19/82 375/240.03 |
| 2016/0198154 | A1* | 7/2016 | Hsiang | H04N 19/70 375/240.03 |

OTHER PUBLICATIONS

Fu et al., "Sample Adaptive Offset in the HEVC Standard", IEEE Transactions on Circuits and Systems for Video Technology, vol. 22, No. 12, Dec. 1, 2012.

Flynn et al., "HEVC Range Extensions Draft 1", 11. JCT-VC Meeting; 102, MPEG Meeting, Jan. 10, 2013.

Al-Abri et al., "Optimal H.264/AVC Video Transcoding System", Consumer Electronics (ICCE), 2011 IEEE International Conference, Jan. 9, 2011, pp. 335-336.

* cited by examiner

METHOD FOR MODIFYING A BINARY VIDEO STREAM

This application is the U.S. national phase of International Application No. PCT/EP2015/054323 filed 2 Mar. 2015, which designated the U.S. and claims priority to FR Patent Application No. 14/51723 filed 4 Mar. 2014, the entire contents of each of which are hereby incorporated by reference.

The present invention relates to a method and device for regulating the complexity of decoding of a previously compressed video stream.

Recent video data compression methods, such as the H.264/AVC standard (ISO/IEC 14496-10—MPEG-4 Part 10, Advanced Video Coding/ITU-T H.264) or the emerging HEVC standard (ISO/IEC 23008-2—MPEG-H Part 2, High Efficiency Video Coding/ITU-T H.265), have provided significant improvement to compression performance. These methods use video coding algorithms that have allowed a reduction in transmission rate of the video data after compression (i.e. encoding) while preserving these video data in terms of image rendering quality after decompression (i.e. decoding).

However, this improvement in performance, essentially due to improvements in existing compression tools and to integration of new compression tools, has resulted in an increase in complexity and consequently in the requirements for memory resources and processing resources of these compression methods. These methods have in fact a very high computing cost and require a storage in memory of a large amount of data. In order to implement these methods, it is necessary to provide encoding and decoding devices having suitable computing capacities and memory capacities.

However, in general for a question of cost price of encoding and decoding devices, the computing capacities and memory capacities are sized so as to be just right, which does not enable the encoding and decoding devices to offer functionalities going beyond those for which these encoding and decoding devices were designed.

On the other hand, it is important to offer the users of video applications novel and innovative advanced functionalities in order to perpetuate their interest in these applications. This is because, whereas in the past these users were content with simple video display functionalities, these users can now look for more interactive display functionalities allowing for example accelerated viewing of a video ("trick mode"), embedding of a video in another video according to a picture-in-picture mode, or viewing of a plurality of videos in parallel, for example in a mosaic video. These new display functionalities give rise to an increase in requirements for computing capacities and requirements for memory capacities of the video applications. For example, accelerated viewing of a video may require decoding a video at a frame rate exceeding a frame rate corresponding to a real-time display of the video. Embedding a video in another video requires two decodings in parallel when the videos are received in the form of two separate video streams. Similarly, displaying a mosaic of videos may require carrying out a plurality of video decodings in parallel.

Many decoding devices do not make it possible to access these advanced display functionalities because of the inadequate sizing of their computing capacities and memory capacities. It would therefore be advantageous to propose solutions making it possible to access these services without requiring the replacement of the decoding devices.

The problem solved by the present invention consists of ensuring compatibility of a binary video stream with computing capacities and optionally memory capacities of a video coding device when the video decoding device is used, for example, to implement display functionalities requiring high computing input.

To this end, according to a first aspect of the present invention, the present invention relates to a method for modifying an encoding binary video stream according to a video coding algorithm comprising a prediction loop and an in-loop post-filtering integrated in the prediction loop. The method comprises the following steps performed by a device: seeking a syntax element relating to the in-loop post-filtering in the binary video stream, the syntax element being used by a decoding device for controlling a complexity of implementation of the in-loop post-filtering; and modifying a value of the syntax element or eliminating the syntax element so as to obtain a reduction in the complexity of implementation of the in-loop post-filtering by the decoding device.

The modification or elimination of syntax elements relating to in-loop filtering makes it possible to indicate to the decoding device that it can implement a simplified in-loop post-filtering or not implement the in-loop post-filtering, which will reduce the decoding complexity. This method has a low computing cost since it does not require decoding and complete re-encoding of the binary video stream.

According to one embodiment, the in-loop post-filtering comprises a deblocking filtering and/or an SAO (sample adaptive offset) filtering.

By making it possible to control a plurality of in-loop post-filtering methods, the method makes it possible to adjust the reduction in the decoding complexity finely.

According to one embodiment, the deblocking filtering attenuating discontinuities between blocks of pixels and comprising a high-complexity filtering strongly attenuating the discontinuities between the blocks of pixels and a low-complexity filtering weakly attenuating the discontinuities between the blocks of pixels, when the value of the syntax element has been modified and the syntax element relates to the deblocking filtering, said value is modified so as to favour use by the decoding device of the low-complexity deblocking filtering compared with the high-complexity deblocking filtering.

In this way, the complexity of use of the deblocking filtering is reduced, while allowing minimum attenuation of the discontinuities between blocks.

According to one embodiment, when the value of the syntax element has been modified and the syntax element relates to deblocking filtering or relates to SAO filtering, modification of the value of the syntax element makes it possible to deactivate respectively the use of the deblocking filtering or the use of the SAO filtering by the decoding device.

The method thus makes it possible to deactivate the use by a decoding device of the deblocking filtering and/or of the SAO filtering, which makes it possible to reduce the decoding complexity.

According to one embodiment, when the syntax element is omitted and the syntax element relates to deblocking filtering or relates to SAO filtering, omission of the syntax element makes it possible to deactivate respectively the use of the deblocking filtering or the use of the SAO filtering by the decoding device.

The method then makes it possible to deactivate the use by the decoding device of the deblocking filtering and/or of the SAO filtering, which makes it possible to reduce the decoding complexity. The method moreover makes it possible, by omitting the syntax elements, to reduce the frame rate of the binary video stream, in particular when the omitted syntax elements are syntax elements relating to the SAO filtering of blocks of pixels.

According to one embodiment, the value of the modified syntax element and/or the omitted syntax element depends on information representing a requirement to reduce a decoding complexity.

In this way the method is adaptive.

According to one embodiment, the need to reduce the decoding complexity depends on a display functionality required by a user for display, on a display device, of images corresponding to the binary video stream.

In this way, the reduction in decoding complexity is adapted to the requirements of the user.

According to one embodiment, the method further comprises the following steps: receiving the binary video stream of a reception device, the binary video stream being received by the reception device by means of a communication network; and transmitting to the decoding device a modified binary video stream resulting from the modification of the binary video stream by the modification method.

In this way, a binary video stream received is adapted according to the requirements of a user before being supplied to the decoding device. It is therefore not necessary to modify, before transmission thereof, an initial binary video stream as generated by a video encoder that other users could wish to decode in maximum quality.

According to one embodiment, the method further comprises the following steps: receiving the binary video stream from an encoding device; receiving information representing a requirement to reduce a decoding complexity by means of a communication network; and transmitting a modified binary video stream resulting from the modification of the binary video stream by a modification method, to a transmission device with a view to transmission of the modified binary video stream over the communication network.

Use of the method before the transmission of the binary video stream over the network makes it possible not to transmit unnecessary syntax elements over the network.

According to one embodiment, said video coding algorithm is based on the H.264/AVC standard or on the HEVC standard.

The method is therefore suited to two very widespread compression standards. In particular, use of the method has a very low computing cost when the method is applied to video streams in accordance with the H.264/AVC standard since in this case the modifications made to the binary video stream concern only header data and therefore do not require a thorough reading of the binary video stream.

According to a second aspect of the present invention, the present invention relates to a device for modifying an encoded binary video stream according to a video coding algorithm comprising a prediction loop and an in-loop post-filtering integrated in the prediction loop. The device comprises: means for seeking in the binary video stream a syntax element relating to the in-loop post-filtering, the syntax element being used by a decoding device for controlling the complexity of use of the in-loop post-filtering; and means for modifying a value of the syntax element and/or means for dispensing with the syntax element so as to obtain a reduction in the complexity of use of the in-loop post-filtering by the decoding device.

The modification device has the same advantages as those mentioned with regard to the first aspect.

According to a third aspect of the present invention, the present invention relates to a system for communicating a binary video stream with a view to display by a display device, the binary video stream having been encoded according to a video coding algorithm comprising a prediction loop and an in-loop post-filtering integrated in the prediction loop, the system comprising a decoding device able to decode the binary video stream and able to transmit to the display device images corresponding to a result of the decoding of the binary video stream. The system comprises a device for modifying a binary video stream according to the second aspect, the modification device being able to supply to the decoding device a modified binary video stream resulting from the modification of the binary video stream by the modification device.

The communication system has the same advantages as those mentioned with regard to the first aspect.

According to a fourth aspect of the present invention, the present invention relates to a computer program product. The computer program product comprises instructions for the implementation, by a device, of the method according to the first aspect, when said program is executed by a processor of said device.

The computer program product has the same advantages as those mentioned with regard to the first aspect.

According to a fifth aspect of the present invention, the present invention relates to storage means. The storage means store a computer program comprising instructions for the implementation, by a device, of the method according to the first aspect, when said program is executed by a processor of said device.

The storage means have the same advantages as those mentioned with regard to the first aspect.

The features of the invention mentioned above, as well as others, will emerge more clearly from a reading of the following description of an example embodiment, said description being given in relation to the accompanying drawings, among which.

The present invention is situated in the field of video compression and applications using compressed videos such as video transmission (streaming) applications. The invention is suited to video compression methods using an in-loop post-filtering, such as H.264/AVC and HEVC.

Figure 4:
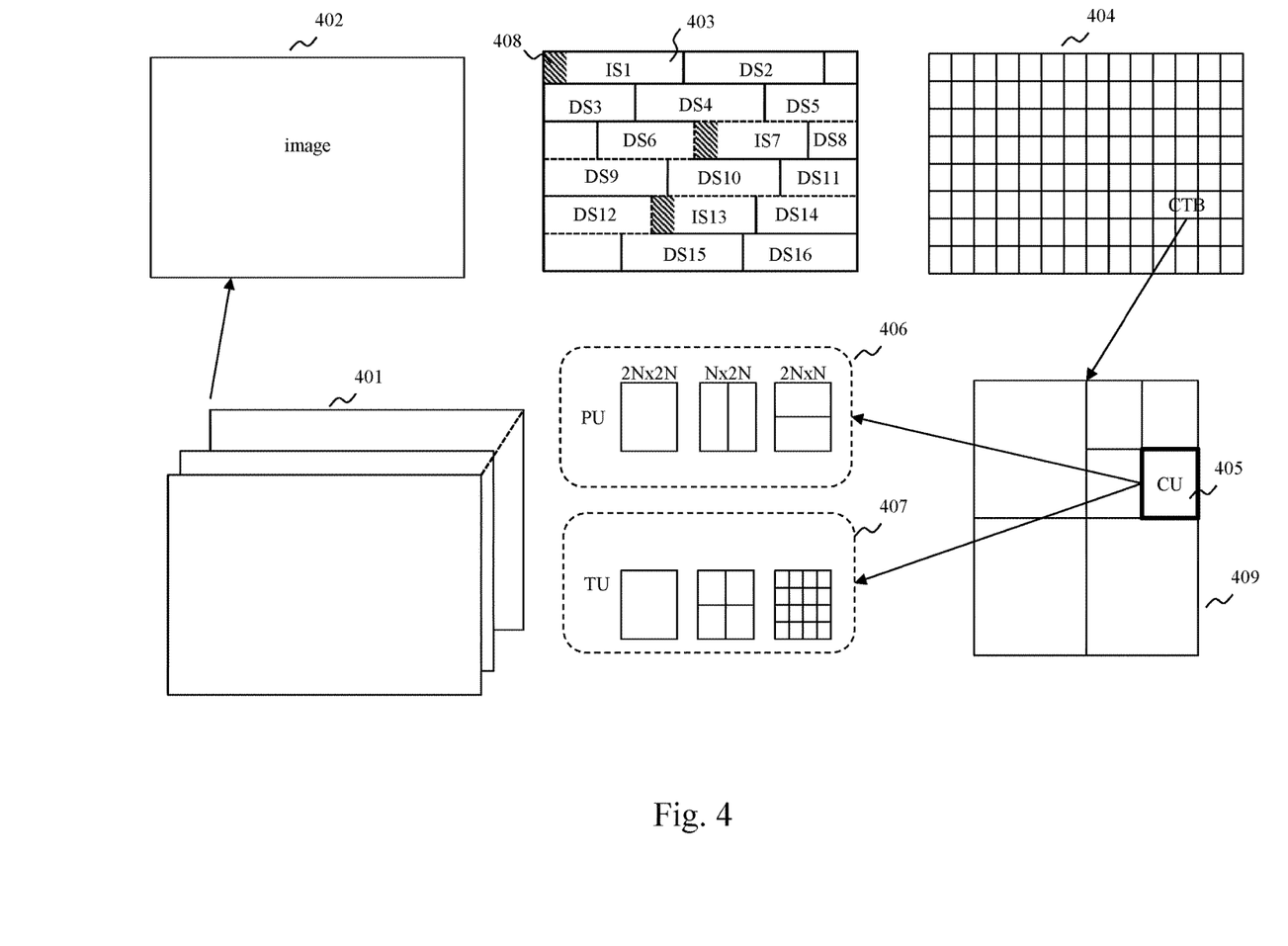
FIG. 4 illustrates schematically the successive partitionings undergone by a video image during an HEVC encoding.
Figure 5:
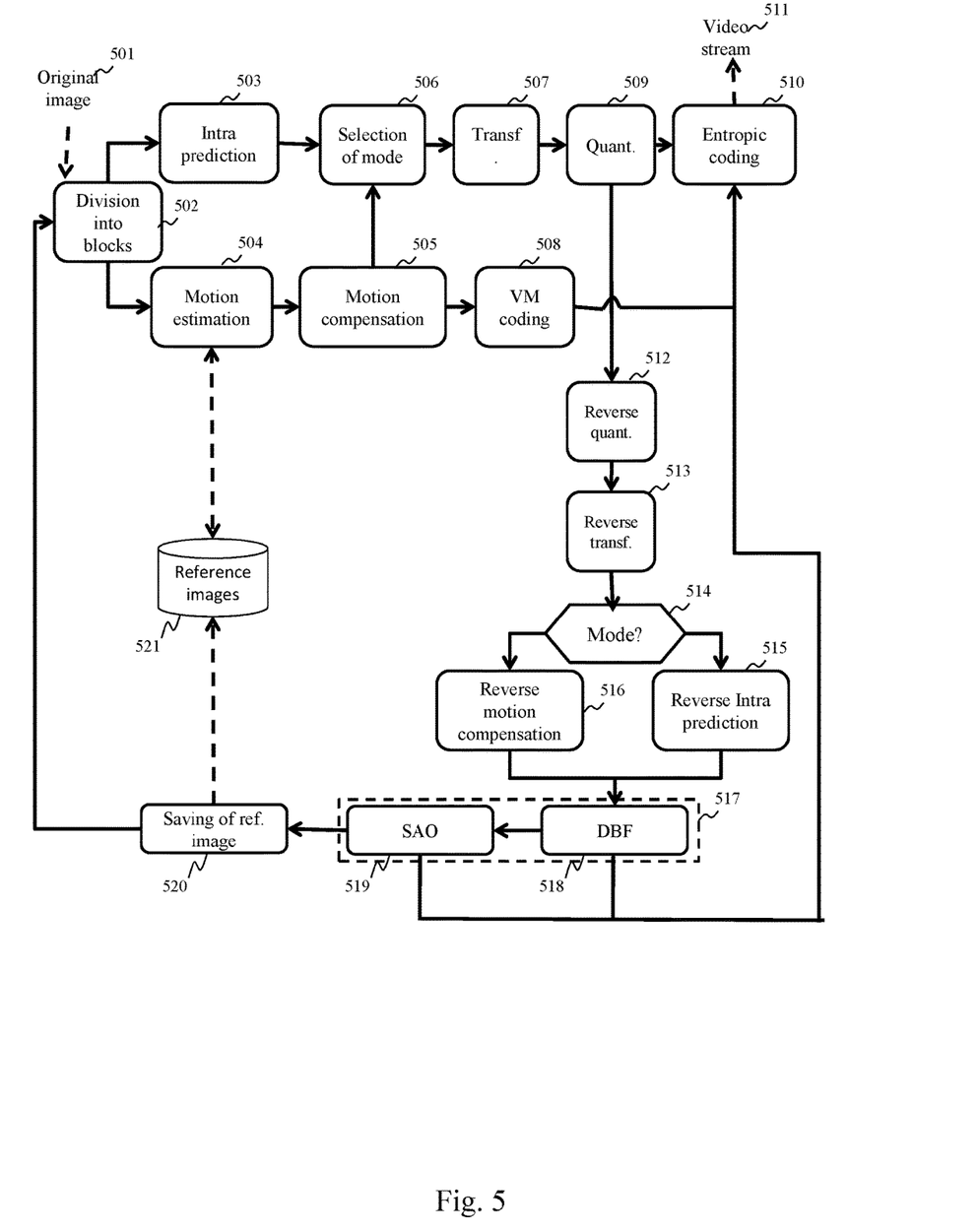
FIG. 5 depicts schematically a method for encoding a video stream compatible with the HEVC standard.
Figure 6:
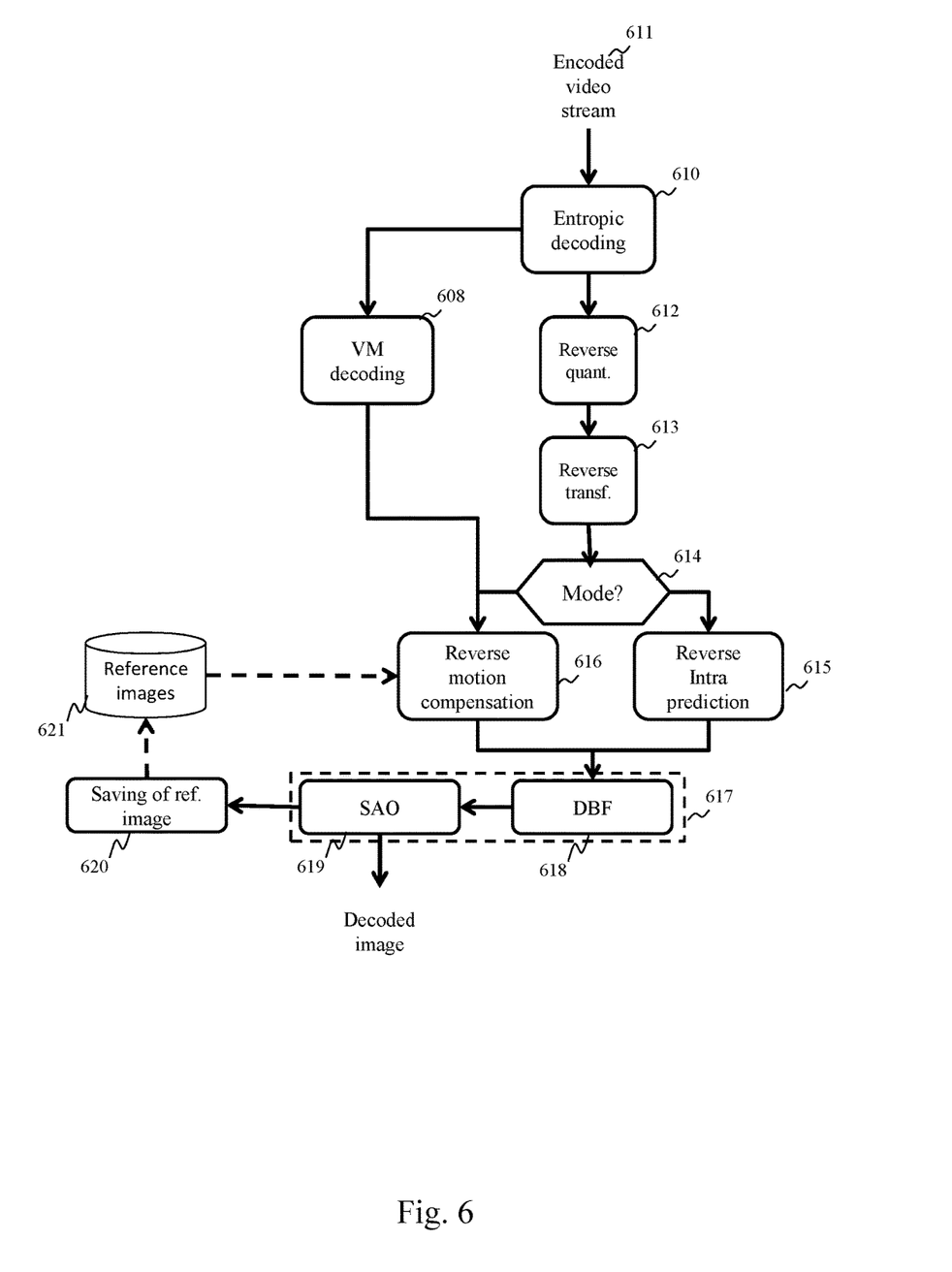
FIG. 6 depicts schematically a decoding method according to the HEVC standard.

FIGS. 4, 5 and 6 describe an example of implementation of the HEVC standard.

FIG. 4 illustrates the successive partitionings undergone by an image of pixels 402 of an original video 401, when it is encoded according to the HEVC standard. It is considered here that a pixel is composed of three components: a luminance component and two chrominance components. In the example in FIG. 4, the image 402 is first divided into three slices. A slice is a region of an image that may cover the whole of an image or only a portion, such as the slice 403 in FIG. 4. A slice comprises at least one slice segment optionally followed by other slice segments. The slice segment in the first position in the slice is referred to as the independent slice segment. An independent slice segment, such as the slice segment IS1 in the slice 403, comprises a complete header, such as the header 408. The header 408 comprises a set of syntax elements enabling the slice to be decoded. Any other slice segments in a slice, such as slice segments DS2, DS3, DS4, DS5 and DS6 in the slice 403 in FIG. 4, are referred to as dependent slice segments since they have only a partial header referring to the header of the dependent slice segment that precedes them in the slice, here the header 408. In the H.264/AVC standard, only the concept of slice exists, a slice necessarily comprising a complete header and not being able to be divided.

It should be noted that each slice of an image can be decoded independently of any other slice in the same image. However, the use of an in-loop post-filtering in a slice may require the use of data of another slice.

After the partitioning of the image 402 into slices, the pixels of each slice of an image are partitioned into coded tree blocks (CTBs), such as a set of blocks 404 in FIG. 4. Hereinafter, in order to simplify, we shall use the acronym CTB in order to designate a coded tree block. A CTB, such as the CTB 409 in FIG. 4, is a square of pixels with a side the size of which is equal to a power of two and the size of which may range from sixteen to sixty-four pixels. A CTB may be partitioned in the form of a quadtree in one or more coding units. A coding unit is a square of pixels with a side the size of which is equal to a power of two and the size of which can range from eight to sixty-four pixels. A coding unit, such as the coding unit 405 in FIG. 4, can next be partitioned into prediction units used during spatial or temporal predictions and into transform units (TUs) used during transformations of blocks of pixels in the frequency domain.

During the coding of an image, the partitioning is adaptive, that is to say each CTB is partitioned so as to optimise the compression performance of the CTB. Hereinafter, in order to simplify, we shall consider that each CTB is partitioned into one coding unit and that this coding unit is partitioned into one transform unit and one prediction unit.

FIG. 5 depicts schematically a method for encoding a video stream compatible with the HEVC standard used by an encoding device. The encoding of a current image 501 of a video begins with a partitioning of the current image 501 during a step 502, as described in relation to FIG. 4. For simplification, in the remainder of the description of FIG. 5 and in the description of FIG. 6, we do not differentiate the CTBs, coding units, transform units and prediction units and we group together these four entities under the term block. The current image 501 is thus partitioned into blocks. For each block, the encoding device must determine a coding mode between an intra-image coding mode, referred to as INTRA coding mode, and an inter-image coding mode, referred to as INTER coding mode.

The INTRA coding mode consists of predicting, in accordance with an INTRA prediction method, during a step 503, the pixels of a current block from a prediction block derived from pixels of reconstructed blocks situated in a causal vicinity of the block to be coded. The result of the INTRA prediction is a prediction direction indicating which pixels of the blocks in the vicinity to use, and a residual block resulting from a calculation of a difference between the current block and the prediction block.

The INTER coding mode consists of predicting the pixels of a current block from a block of pixels, referred to as the reference block, of an image preceding or following the current image, this image being referred to as the reference image. During the coding of a current block in accordance with the INTER coding mode, the block of the reference image closest, in accordance with a similarity criteria, to the current block is determined by a motion estimation step 504. During step 504, a motion vector indicating the position of the reference block in the reference image is determined. Said motion vector is used during a motion compensation step 505 during which a residual block is calculated in the form of a difference between the current block and the reference block. It should be noted that we have described here a mono-predicted inter coding mode. There also exists a bi-predicted inter coding mode (or B mode) for which a current block is associated with two motion vectors, designating two reference blocks in two different images, the residual block of this block then being an average of two residual blocks.

During a selection step 506, the coding mode optimising the compression performances, in accordance with a rate/distortion criterion, among the two modes tested, is selected by the encoding device. When the coding mode is selected, the residual block is transformed during a step 507 and quantised during a step 509. When the current block is coded according to the INTRA coding mode, the prediction direction and the transformed and quantised residual block are encoded by an entropic encoder during a step 510. When the current block is encoded according to the INTER coding mode, the motion vector of the block is predicted from a prediction vector selected from a set of motion vectors corresponding to reconstructed blocks situated in the vicinity of the block to be coded. The motion vector is next encoded by the entropic encoder during step 510 in the form of a motion residual and an index for identifying the prediction vector. The transformed and quantised residual block is encoded by the entropic encoder during step 510. The result of the entropic encoding is inserted in a binary video stream 511.

After quantisation during step 509, the current block is reconstructed so that the pixels that said current block contains can be used for future predictions. This reconstruction phase is also referred to as a prediction loop. A reverse quantisation is therefore applied to the transformed and quantised residual block during a step 512 and a reverse transformation is applied during a step 513. According to the coding mode used for the block obtained during a step 514, the prediction block of the block is reconstructed. If the current block is encoded according to the INTER coding mode, the coding device applies, during a step 516, a reverse motion compensation using the motion vector of the current block in order to identify the reference block of the current block. If the current block is encoded according to an INTRA coding mode, during a step 515, the prediction direction corresponding to the current block is used for reconstructing the reference block of the current block. The reference block and the reconstructed residual block are added in order to obtain the reconstructed current block.

Following the reconstruction, an in-loop post-filtering is applied, further a step 517, to the reconstructed block. This post-filtering is called in-loop post-filtering since this post-filtering occurs in the prediction loop so as to obtain the encoding of the same reference images as the decoding and thus avoid an offset between the encoding and the decoding. The in-loop post-filtering forms part of the new compression tools that appeared in H.264/AVC and improved in HEVC. The in-loop post-filtering of HEVC comprises two in-post-filtering methods, i.e. a deblocking filtering and an SAO (sample adaptive offset) filtering. The post-filtering of H.264/AVC comprises only deblocking filtering.

The purpose of deblocking filtering is to attenuate any discontinuities at block boundaries due to the differences in quantisation between blocks. It is an adaptive filtering that can be activated or deactivated and, when it is activated, can take the form of a high-complexity deblocking filtering based on a separable filter with a dimension comprising six filter coefficients, which is referred to hereinafter as strong filter, and a low-complexity deblocking filtering based on a separable filter with one dimension comprising four coefficients, which is referred to hereinafter as weak filter. The strong filter greatly attenuates discontinuities at the block boundaries, which may damage spatial high frequencies present in original images. The weak filter weakly attenuates discontinuities at the block boundaries, which makes it possible to preserve high spatial frequencies present in the original images but which will be less effective on discontinuities artificially created by the quantisation. The decision to filter or not to filter, and the form of the filter used in the event of filtering, depend on the value of the pixels at the boundaries of the block to be filtered and two parameters $\beta$ and $t_c$ determined by the encoding device. During step 510 of entropic encoding, the encoding device inserts in the binary video stream 511 syntax elements (pps_beta_offset_div2 and pps_tc_offset_div2 in PPS (picture parameter set) containers, and slice_beta_offset_div2 and slice_tc_offset_div2 in the slice header) making it possible to find the respective values of the parameters $\beta$ and $t_c$. A decoding device can determine, using these syntax elements, if a deblocking filtering must be applied and the form of deblocking filtering to be applied.

SAO filtering takes two forms having two different objectives. The purpose of the first form, referred to as edge offset, is to compensate for the effects of the quantisation on the edges in the blocks. SAO filtering by edge offset comprises a classification of the pixels of the reconstructed image in accordance with four categories corresponding to four respective types of edge. The classification of a pixel is done by filtering according to four filters, each filter making it possible to obtain the filtering gradient. The filtering gradient maximising a classification criterion indicates the type of edge corresponding to the pixel. Each type of edge is associated with an offset value that is added to the pixels during the SAO filtering.

The second form of SAO is referred to as band offset and its purpose is to compensate for the effect of the quantisation of the pixels belonging to certain ranges (i.e. bands) of values. In band-offset filtering, all the possible values for a pixel, most frequently lying between 0 and 255 for 8-bit video streams, is divided into thirty-two bands of eight values. Among these thirty-two bands, four consecutive bands are selected to be offset. When a pixel has a value lying in one of the four bands of values to be offset, an offset value is added to the value of the pixel.

The decision to use SAO filtering and, when SAO filtering is used, the form of the SAO filtering and the offset values are determined for each CTB by the encoding device by means of a rate/distortion optimisation. During step 510 of entropic encoding, the encoding device inserts information in the binary video stream 511 enabling a decoding device to determine whether the SAO filtering is to be applied to a CTB and, where applicable, the form and the parameters of the SAO filtering to be applied.

When a block is reconstructed, it is inserted during a step 520 into a reconstructed image stored in a memory 521 of reconstructed images, also referred to as a reference image memory. The reconstructed images thus stored can then serve as reference images for other images to be coded.

When all the blocks of a slice are coded, the binary video stream corresponding to the slice is inserted in a container called a network abstraction layer unit (NALU). In the case of network transmission, these containers are inserted in network packets either directly or in intermediate transport stream containers, such as the MP4 transport stream.

A container containing a slice is referred to as a video coding layer (VCL) slice. Other types of container were defined in the HEVC and H.264/AVC standards. These containers are in general headers containing information useful for the decoding of a video sequence such as SPS (sequence parameter set) containers or for the decoding of a subset of images of a video sequence such as PPS containers. Each PPS container comprises an identifier enabling it to be recognised. Each slice is associated with a PPS container. To do this, each slice comprises a syntax element containing the identifier of the PPS container corresponding to the slice. In a similar manner, each SPS container comprises an SPS container identifier enabling it to be recognised. Each PPS container is associated with an SPS container. To do this, each PPS container comprises a syntax element containing the identifier of the SPS container associated with the PPS container.

FIG. 6 depicts schematically a method for decoding a stream compressed according to the HEVC standard used by a decoding device. The decoding is done block by block. For a current block, it commences with an entropic decoding of the current block during a step 610. Entropic decoding makes it possible to obtain the coding mode of the block.

If the block has been encoded according to the INTER coding mode, the entropic decoding makes it possible to obtain a prediction vector index, a motion residual and a residual block. During a step 608, a motion vector is reconstructed for the current block using the prediction vector index and the motion residual.

If the block has been encoded according to INTRA coding mode, entropic decoding makes it possible to obtain a prediction direction and a residual block. Steps 612, 613, 614, 615 and 616 implemented by the decoding device are in all respects identical respectively to steps 512, 513, 514, 515 and 516 implemented by the encoding device.

The decoding device next applies an in-loop post-filtering during a step 617. As with encoding, the in-loop post-filtering comprises for the HEVC standard a deblocking filtering and an SAO filtering, whereas the in-loop filtering comprises only a deblocking filtering for the H.264/AVC standard.

The deblocking filtering is implemented by the decoding device during a step 618. During decoding, the decoding device finds the parameters β and $t_c$ using the syntax elements pps_beta_offset_div2, pps_tc_offset_div2, slice_beta_offset_div2 and slice_tc_offset_div2 written in the binary video stream. It must on the other hand determine the form of the filter to be applied according to the values of the pixels at the boundaries of blocks and the parameters β and $t_c$.

The SAO filtering is implemented by the decoding device during a step 619. During the decoding, the decoding device does not have to determine whether the SAO filtering is to be applied to a block and, if the SAO filtering is to be applied, the decoding device does not have to determine the form of SAO filtering to be applied and the offset values, since the decoding device will find this information in the binary video stream. If, for a CTB, the SAO filtering is of the edge offset form, for each pixel of the CTB, the decoding device must determine the type offset by filtering, and add the offset value corresponding to the type of edge determined. If, for a CTB, the SAO filtering is of the band offset form, for each pixel of the CTB the decoding device compares the value of the pixel to be filtered with the ranges of values to be offset and, if the value of the pixel belongs to one of the ranges of values to be offset, the offset value corresponding to said value range is added to the value of the pixel.

As seen above, the in-loop post-filtering forms part of the compression tools that appeared in H.264/AVC and HEVC that made it possible to improve the compression performance. The in-loop post-filtering gave rise to an increase in complexity of implementation of the video compression standards and in particular an increase in complexity of the implementation of the decoding.

In order to reduce the complexity of decoding of a binary video stream, the invention controls the implementation of the in-loop post-filtering by modifications to the binary video stream according to display functionalities required by a user. The modifications to the binary video stream occur before the decoding of the binary video stream. The invention therefore makes it possible to reduce the computing cost of the decoding, which releases computing capacities at the decoding devices and thus allows in particular a use of advanced display functionalities.

Figure 1A:
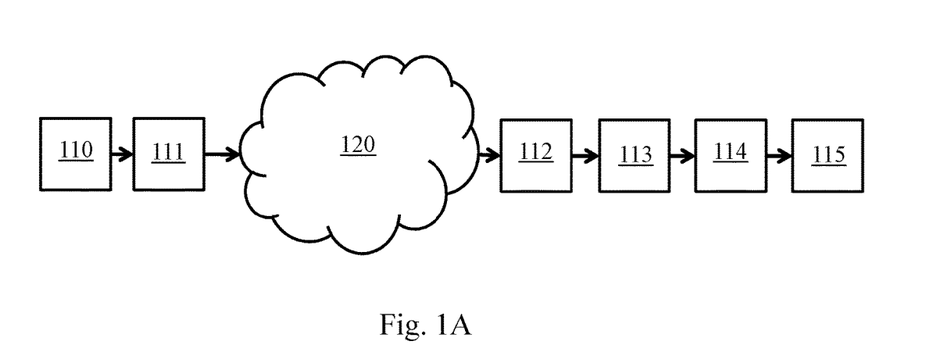
FIG. 1A depicts schematically a first video transmission system comprising a device implementing the invention.

The invention will now be presented in the context of a transmission of videos over a communication network. FIG. 1A represents schematically a video transmission system comprising a device implementing the invention. The video transmission system comprises a video source 110 such as for example a video encoder, a digital video camera or a digital hard disc. The video source 110 supplies, to a transmission device 111, a binary video stream encoded according to the HEVC standard or according to the H.264/AVC standard. The transmission device 111 comprises a multiplexer for combining the binary video stream with other binary streams, such as binary audio streams, in order to form a multiplexed binary stream. The multiplexed binary stream is subsequently transmitted over a communication network 120 such as example the Internet or a LAN (Local Area Network), either wired or wireless. Following the transmission, the multiplexed binary stream is received by a reception device 112 comprising a demultiplexer. The demultiplexer then extracts the binary video stream from the multiplexed binary stream and the reception device 112 transmits the binary video stream to a binary video stream modification device 113 according to one aspect of the invention. According to the display functionality required by the user, the binary video stream modification device 113, which, in order to simplify, we shall hereinafter refer to as the modification device, can modify the binary video stream so as to reduce the complexity of the in-loop post-filtering. The modified binary video stream is next transmitted to a decoding device 114 that decodes the modified binary video stream, the result of the decoding being displayed by a display device 115.

Figure 2:
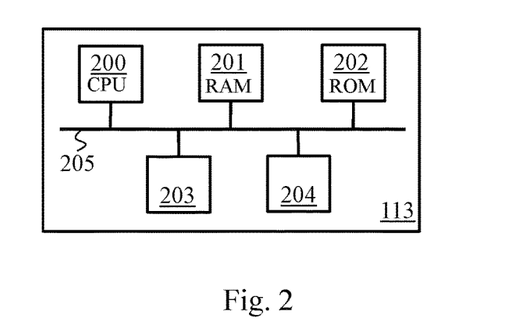
FIG. 2 depicts schematically a device able to implement the present invention.

FIG. 2 illustrates schematically an example of hardware architecture of a device able to implement the binary video stream modification device 113. The device 113 comprises, connected by a communication bus 205: a processor or CPU (central processing unit) 200; a random access memory (RAM) 201, a read only memory (ROM) 202; a storage unit 203 or a storage medium reader, such as a SD (secure digital) card reader or a hard disc drive (HDD); at least one interface 204 for exchanging data with other equipment. The interface 204 enables the modification device 113 to receive binary video streams, to transmit modified binary video streams and to receive instructions from a user by means for example of a control device (not shown) such as a remote control, enabling the user to manipulate a graphical interface on the display device 115.

The processor 200 is capable of executing instructions loaded into the RAM 201 from the ROM 202, from an external memory (not shown), from a storage medium, or from the communication network 120. When the modification device 113 is powered up, the processor 200 is capable of reading instructions from the RAM 201 and executing them. These instructions form a computer program causing the implementation by the processor 200 of all or some of the algorithms and steps described hereinafter in relation to the modification device 113.

All or some of the algorithms and steps described hereinafter may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 3:
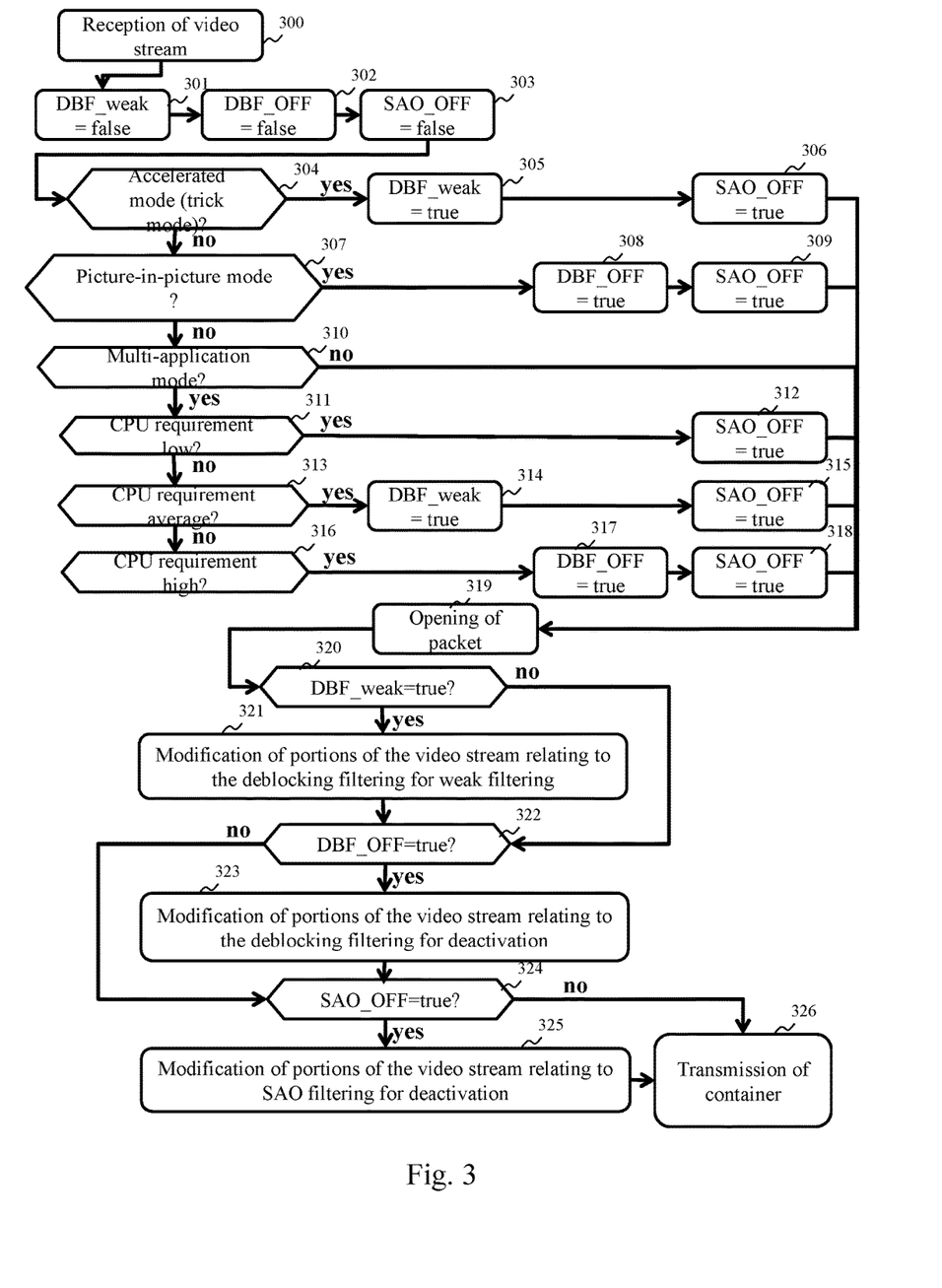
FIG. 3 depicts schematically a method for ensuring the compatibility of a binary video stream with computing capacities and optionally memory capacities of a video decoding device, when the video decoding device is used for implementing display functionalities requiring high computing input.

FIG. 3 depicts schematically an algorithm for ensuring compatibility of a binary video stream with computing capacities of a video decoding device when the video decoding device is used for implementing display functionalities requiring a high computing input. The algorithm begins during a step 300 with the reception by the modification device 113 of a binary video stream encoded in accordance with the HEVC standard. Three Boolean variables are next initialised: a variable DBF_weak indicating, when said variable is set to true, that the deblocking filtering must favour the weak filter is initialised to false during a step 301; a variable DBF_OFF indicating, when it is set to true, that the deblocking filtering must be deactivated is initialised to false during a step 302; a variable SAO_OFF indicating, when it is set to true, that the SAO filtering must be deactivated is initialised to false during a step 303. The modification device 113 next determines which display functionality is required by the user. Each display functionality corresponds to a complexity of implementation. It is assumed here that the modification device 113 knows the complexity of implementation of each display functionality that a user could formulate. The modification device 113 then compares this information on the complexity of implementation of display functionalities with information on the processing capacities of the decoding device 114. This comparison enables the modification device 113 to determine which are the requirements for modification of the binary video stream in terms of reduction of the decoding complexity so that the decoding of this binary video stream, in the context of the display functionality required by the user, is compatible with the processing capacities of the decoding device 114. The modifications to be made to the binary video stream depend on this requirement for reduction of the decoding complexity.

In one embodiment, this comparison uses a set of thresholds. Each threshold making it possible to determine how the modification device must modify the binary video stream. If the complexity of implementation is less than a first threshold, the binary video stream is not modified; if the complexity of implementation lies between the first threshold and a second threshold, the SAO filtering is deactivated; if the complexity of implementation lies between the second threshold and a third threshold, the SAO filtering is deactivated and the low-complexity deblocking filtering is favoured; if the complexity of implementation is higher than the third threshold, the SAO filtering and the deblocking filtering are deactivated.

During a step 304, the modification device 113 determines whether the user wishes to display the video in accelerated mode. In this case, the binary stream modification device 113 fixes the variable Dbf_weak to true during a step 305 and the variable SAO_OFF to true to a step 306.

Otherwise, during a step 307, the modification device 113 determines whether the user wishes to display two videos according to a picture-in-picture mode, a first video being displayed with a low resolution and embedded in the second video displayed in full resolution. In this case, the modification device 113 fixes the variable DBF_OFF to true during a step 308 and the variable SAO_OFF to true during a step 309.

Otherwise, during a step 310, the modification device 113 determines whether the user wishes to use a multi-application mode. A multi-application mode may be a combination of a plurality of display functionalities such as for example accelerated display combined with the picture-in-picture mode or a mosaic mode in which a plurality of low-resolution videos are displayed simultaneously. If a multi-application mode is requested, the modification device 113 determines the complexity of implementation of the multi-application mode requested. During a step 311, the modification device 113 determines whether the complexity of implementation is low, for example between the first and second thresholds. A multi-application mode having a low complexity of implementation may for example be a request to display in picture-in-picture mode in which the low-resolution video is displayed accelerated. If such is the case, the modification device 113 fixes the variable SAO_OFF to true during a step 312.

Otherwise, during a step 313, the modification device 113 determines whether the complexity of implementation of the multi-application mode is moderate, for example between the second and third thresholds. A multi-application mode having a medium complexity of implementation may for example be a request to display in picture in-picture mode in which the full-resolution video is displayed accelerated. If such is the case, the modification device 113 fixes the variable Dbf_weak to true during a step 314 and the variable SAO_OFF to true during a step 315.

Otherwise, during a step 316, the modification device 113 determines whether the complexity of implementation is high, for example higher than the third threshold. A multi-application mode having a high computing cost may for example be a request to display a mosaic of a plurality of low-resolution videos. If such is the case, the modification device 113 fixes the variable DBF_OFF to true during a step 317 and the variable SAO_OFF to true during a step 318.

If during step 310 no display functionality is requested or if the display functionality requested is not recognised, the modification device 113 does not change the variables Dbf_weak, DBF_OFF and SAO_OFF. In this case, the display is a conventional display of a video in full resolution. It may be noted that the variables Dbf_weak and DBF_OFF may not both be equal to true. It is in fact not necessary to modify a binary video stream so as to favour the use of the low-complexity deblocking filter when the deblocking filter is intended to be deactivated.

After having taken into account the display functionality requirements of the user, the modification device 113 begins the modification of the video stream received. This video stream was received in the form of network packets. It is considered here that each network packet contains a single container. The modification device 113 processes the packets one by one in their order of arrival. During a step 319, the modification device 113 removes the container from the first packet. The modification device 113 then checks, in a step 320, the value of the variable DBF_weak. If the variable DBF_weak is at true, the container is processed in a first modification step 321 for modifying portions of the binary video stream. An example of implementation of this first modification step 321 is detailed hereinafter in relation to FIG. 7. The first modification step 321 transforms a binary video stream portion corresponding to the container so as to favour the use of the weak deblocking filter during decoding. Syntax elements controlling the complexity of implementation of the deblocking filtering are then modified.

During a step 322 following step 321 (or step 320 if the variable DBF_weak is at false), the modification device 113 tests the value of the variable DBF_OFF. If the variable DBF_OFF is at true, the container is processed by a second step 323 of modifying portions of the binary video stream. An example of implementation of this second modification step 323 is detailed hereinafter in relation to FIG. 8. The second modification step 323 transforms a binary video stream portion corresponding to the container so as to deactivate the deblocking filtering during decoding. Syntax elements controlling the complexity of implementation of the deblocking filtering are then modified or eliminated.

During a step 324 following step 323 (or step 322 if the variable DBF_OFF is at false), the modification device tests the value of the variable SAO_OFF. If the variable SAO_OFF is at true, the container is processed by a third step 325 of modifying portions of the binary video stream. An example of implementation of this third modification step 325 is detailed hereinafter in relation to FIG. 9. The third modification step 325 transforms a binary video stream portion corresponding to the container so as to deactivate the SAO filtering during decoding. Syntax elements controlling the complexity of implementation of the SAO filtering are then eliminated or modified.

Step 325 (or step 324 if the variable SAO_OFF is at false) is followed by a step 326 during which the container is transmitted to the device following the modification device 113, i.e. the decoding device 114 in the example in FIG. 1A.

FIG. 3 depicts schematically a method for ensuring the compatibility of video display functionalities with computing capacities of a video decoding device. This method is suited to binary video streams encoded according to the HEVC standard. This method may be adapted to binary video streams encoded according to the H.264/AVC standard by eliminating all the steps relating to SAO filtering (steps 303, 306, 309, 312, 315, 318, 324, 325). In a particular embodiment, during step 300, the modification device 113 recognises the encoding standard applied during the encoding of the binary video stream between HEVC and H.264/AVC, which, in the remainder of the method, makes it possible to apply or not the steps relating to the SAO filtering. In this embodiment, the decoding device 114 is able to decode the binary video streams encoded according to the HEVC and H.264/AVC standards. It should be noted that, when the method is applied to a binary video stream encoded according to the H.264/AVC standard, only syntax elements included in SPS and PPS containers and in slice headers are modified, which facilitates modification of the binary video stream.

Moreover, in the algorithm described in relation to FIG. 3, the modifications to be made to the binary video stream depend on the display functionalities required by a user. In another alternative embodiment, the modifications to be made to the binary video stream depend on decoding tools implemented by the decoding device 114. For example, some decoding devices implement post-filtering tools apart from the prediction loop. These post-filtering tools apart from the prediction loop may be very efficient and reduce the advantage of using deblocking filtering and SAO filtering. In addition, these post-filtering tools apart from the prediction loop also increase the decoding complexity. In some cases, it may be preferred to use these tools rather than the loop filtering tools specified by the video compression standards. Consequently, in this alternative embodiment, information on the post-filtering tools apart from the prediction loop are supplied to the modification device 113, which modifies and/or deactivates the implementation of SAO filtering and/or deblocking filtering if necessary.

Moreover, FIG. 3 depicts schematically an algorithm for ensuring the compatibility of a binary video stream with computing capacities of a video decoding device when the video decoding device is used to implement display functionalities requiring a high computing input. In another embodiment, this algorithm could make it possible to ensure the compatibility of a binary video stream with the memory capacities of a video decoding device. In this embodiment, each display functionality corresponds to a memory cost. It is assumed here that the modification device 113 knows the memory cost corresponding to the implementation of each display functionality that a user could formulate. The modification device 113 then compares this information on the memory cost of the display functionalities with information on the memory capacities of the decoding device 114. This comparison enables the modification device 113 to determine what are the binary video stream modification requirements in terms of reduction of the memory costs so that the decoding of this binary video stream, in the context of the display functionality required by the user, is compatible with the memory capacities of the decoding device 114. The modifications to be made to the binary video stream are dependent on this requirement for reducing the memory costs. This embodiment can be combined with the embodiment based on the computing cost. In the case of combination, the complexity of implementation of the decoding concerns both a computing complexity and also a complexity in terms of use of the memory of the decoding device 114. The binary video stream modified by the modification device 113 is then compatible with the computing capacities of the decoding device 114, but also with the memory capacities of the decoding device 114.

Figure 7:
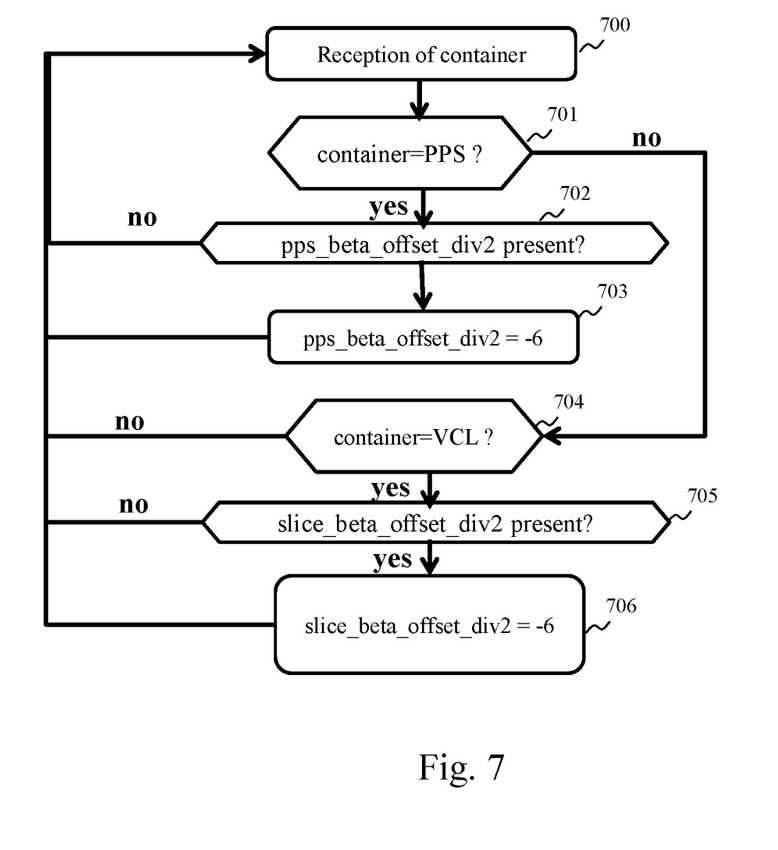
FIG. 7 depicts schematically an algorithm modifying a video stream and thus making it possible to obtain a reduction in the complexity of decoding of said video stream through the simplification of a post-filtering method of the deblocking filter type.

FIG. 7 details an algorithm used by the modification device 113 for transforming an HEVC container so as to favour the use of the weak deblocking filter during decoding. The algorithm begins with the reception of a container during a step 700. The type of container received is next checked by the modification device 113 during a step 701. If the container is a PPS container, the modification device 113 seeks in a step 702 the syntax element pps_beta_offset_div2 for checking the value of the deblocking filtering parameter. If the syntax element pps_beta_offset_div2 is present, the modification device forces the value of the syntax element pps_beta_offset_div2 to the value "−6". By fixing the value of the syntax element pps_beta_offset_div2 to the value "−6", the chances of use of the 4-coefficient deblocking filter during decoding is increased. In an alternative embodiment, the modification device may also force the value of the syntax element pps_tc_offset_div2 to the value "−6", which has the effect of even more favouring the use of the 4-coefficient deblocking filter during decoding. After implementation of step 703, or in the event of a negative response during step 701 or 702, the modification device 113 awaits reception of a new container. The reception of a new container causes return to the step 700.

If the container is not of the PPS type, the modification device 113 checks, during a step 704, whether the container is of the VCL type. If such is the case, the modification device 113, during a step 705, seeks, in the header of the slice corresponding to the container, the syntax element slice_beta_offset_div2 for controlling the value of the deblocking filtering parameter at a slice. If the syntax element slice_beta_offset_div2 is present, the modification device 113 fixes the value of the syntax element slice_beta_offset_div2 to the value "−6". By fixing the value of the syntax element slice_beta_offset_div2 to the value "−6", the chances of the use of the weak deblocking filter during decoding are increased. In another implementation, the syntax element slice_beta_offset_div2 is eliminated in the binary video stream portion corresponding to the slice. In this implementation, the value of the syntax element slice_beta_offset_div2 is copied from the value of the syntax element PPS_beta_offset_div2 contained in the PPS container corresponding to the slice. In an alternative embodiment, the modification device may also force the value of the syntax element slice_tc_offset_div2 to the value "−6", or eliminate the syntax element slice_tc_offset_div2 the value of which can be copied from the value of the syntax element pps_tc_offset_div2.

After implementation of step 706, or in the case of a negative response during step 704 or 705, the modification device 113 awaits the reception of a new container. The reception of a new container causes return to step 700.

Figure 8:
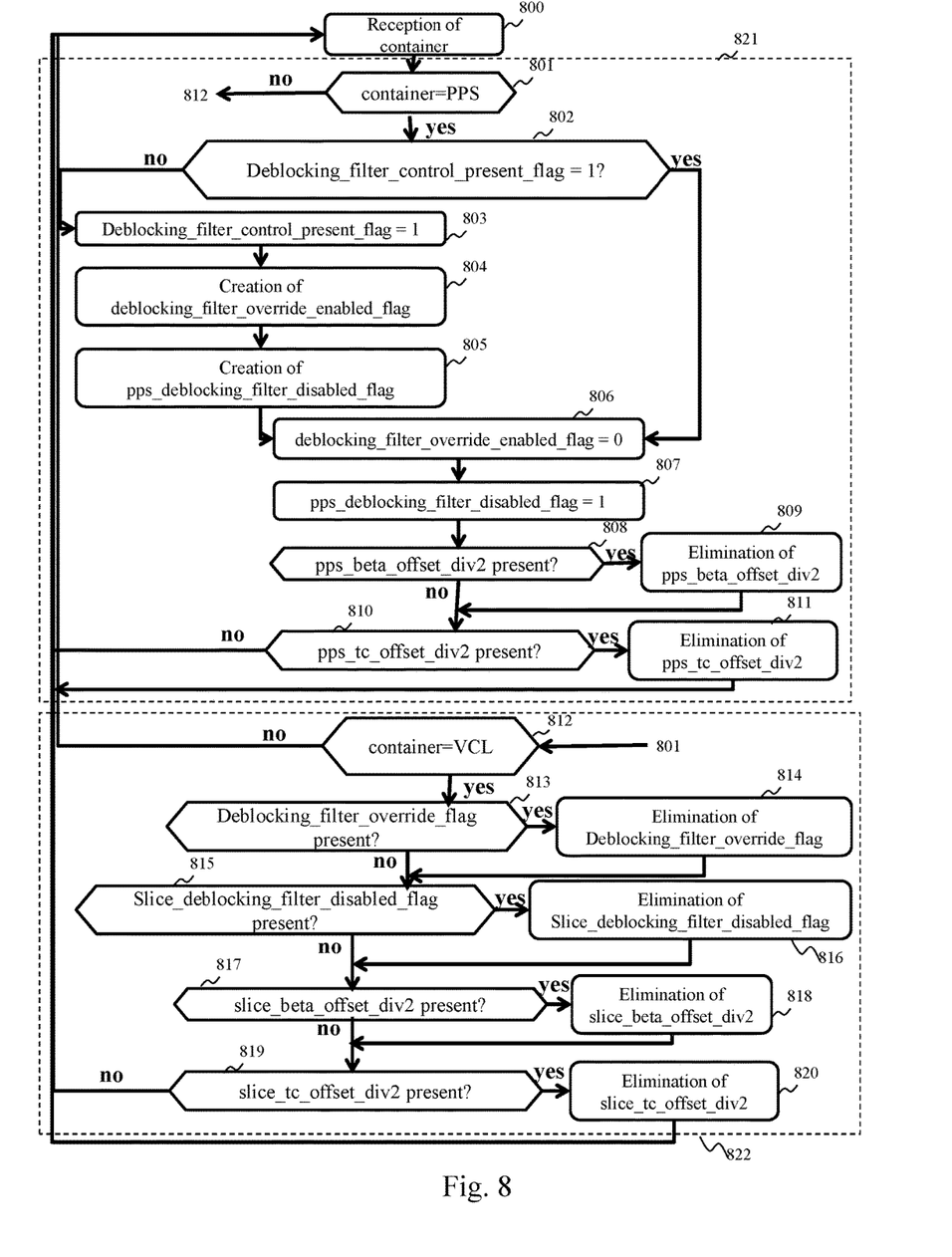
FIG. 8 depicts schematically an algorithm modifying a video stream and thus making it possible to obtain a reduction in the complexity of decoding of said video stream by preventing the use of a post-filtering method of the deblocking filter type.

FIG. 8 details an algorithm used by the modification device 113 for transforming an HEVC container so as to deactivate the use of the deblocking filtering during decoding. A first part 821 of the algorithm is applied when a PPS container is received. This first part ensures consistency with the deactivation of the deblocking filtering of a set of syntax elements of a PPS container relating to the deblocking filtering. The algorithm begins with the reception of a container during a step 800. The type of container received is then checked by the modification device 113 during a step 801. If the container is a PPS container, the modification device 113 during a step 802 seeks a syntax element Deblocking_filter_control_present_flag, indicating the presence of syntax elements relating to the deblocking filtering in the container. When the syntax element Deblocking_filter_control_present_flag is found, the modification device 113 checks the value of the syntax element Deblocking_filter_control_present_flag. If the value of the syntax element Deblocking_filter_control_present_flag is different from "1", the modification device fixes the syntax element Deblocking_filter_control_present_flag at the value "1" during a step 803, then creates a syntax element deblocking_filter_override_enabled_flag, enabling a slice to modify parameter values relating to the deblocking filtering, during a step 804, and a syntax element pps_deblocking_filter_disabled_flag, indicating that the slices referring to this PPS container do not use the deblocking filtering, during a step 805. Step 805 (or step 802 when the syntax element Deblocking_filter_control_present_flag is equal to "1") is followed by a step 806. If the syntax element Deblocking_filter_control_present_flag is equal to "1", the modification device 113 seeks the syntax element deblocking_filter_override_enabled_flag. The syntax element deblocking_filter_override_enabled_flag is then set to "0". If the syntax element Deblocking_filter_control_present_flag was equal to "0", the syntax element deblocking_filter_override_enabled_flag is then set to "0" and the syntax element deblocking_filter_override_enabled_flag is inserted in the binary stream portion corresponding to the container. During a step 807, if the syntax element Deblocking_filter_control_present_flag is equal to "1", the modification device 113 seeks the syntax element pps_deblocking_filter_disabled_flag. The syntax element pps_deblocking_filter_disabled_flag is then set to "1". If the syntax element Deblocking_filter_control_present_flag is equal to "0", the syntax element pps_deblocking_filter_disabled_flag is then set to "1" and the syntax element pps_deblocking_filter_disabled_flag is inserted in the binary stream portion corresponding to the container.

During a step 808, the modification device 113 seeks, in the binary video stream portion corresponding to the container, the syntax element pps_beta_offset_div2 for controlling the value of the parameter β of the deblocking filter. If the syntax element pps_beta_offset_div2 is present, it is eliminated in the binary video stream portion corresponding to the container during a step 809.

Step 808 (or step 809) if the syntax element pps_beta_offset_div2 is present) is followed by a step 810 during which the modification device 113 seeks, in the binary video stream portion corresponding to the container, the syntax element pps_tc_offset_div2 for controlling the value of the parameter $t_c$ of the deblocking filter. If the syntax element pps_tc_offset_div2 is present, it is eliminated in the binary video stream portion corresponding to the container during a step 811.

After having transformed the PPS container, the modification device 113 awaits the reception of a new container. The reception of a new container causes return to step 800.

If, during step 801, the container is not a PPS container, the modification device 113 checks whether it is a VCL container during a step 812. If the container is not a VCL container, the modification device 113 awaits reception of a new container. The reception of a new container causes return to step 800.

If the container is a VCL container, the modification device 113 applies a second part 822 of the algorithm, as depicted in FIG. 8. By applying this second part 822 of the algorithm, the modification device 113 ensures consistency with the deactivation of the deblocking filtering of a set of syntax elements of the slice relating to the deblocking filtering. This second part 822 of the algorithm consists of eliminating all the syntax elements relating to the deblocking filtering of the header of the slice contained in the VCL container. In a step 813, the modification device 113 seeks a syntax element Deblocking_filter_override_flag, indicating the presence of parameters relating to the deblocking filtering in the slice.

If the syntax element Deblocking_filter_override_flag is present, the modification device 113 eliminates the syntax element Deblocking_filter_override_flag from the binary video stream portion corresponding to the container during a step 814.

Step 813 (or step 814 if the syntax element Deblocking_filter_override_flag is present) is followed by a step 815 during which the modification device 113 seeks a syntax element Slice_deblocking_filter_disabled_flag indicating whether or not the deblocking filtering is activated or not for the slice contained in the container. If the syntax element Slice_deblocking_filter_disabled_flag is present, the modification device eliminates the syntax element Slice_deblocking_filter_disabled_flag from the binary video stream portion corresponding to the container during a step 816.

Step 815 (or step 816 if the syntax element Slice_deblocking_filter_disabled_flag is present) is followed by a step 817 during which the modification device 113 seeks the syntax element slice_beta_offset_div_2. If the syntax element slice_beta_offset_div_2 is present, the modification device eliminates the syntax element slice_beta_offset_div_2 from the binary video stream portion corresponding to the container during a step 818.

Step 817 (or step 818 if the syntax element slice_beta_offset_div_2 is present) is followed by a step 819, during which the modification device 113 seeks the syntax element slice_tc_offset_div_2. If the syntax element slice_tc_offset_div_2 is present, the modification device eliminates the syntax element slice_tc_offset_div_2 from the binary video stream portion corresponding to the container during a step 820.

After implementation of step 819 (or step 820 if the syntax element slice_tc_offset_div_2 is present), the modification device 113 awaits reception of a new container. The reception of a new container causes return to step 800.

Figure 9:
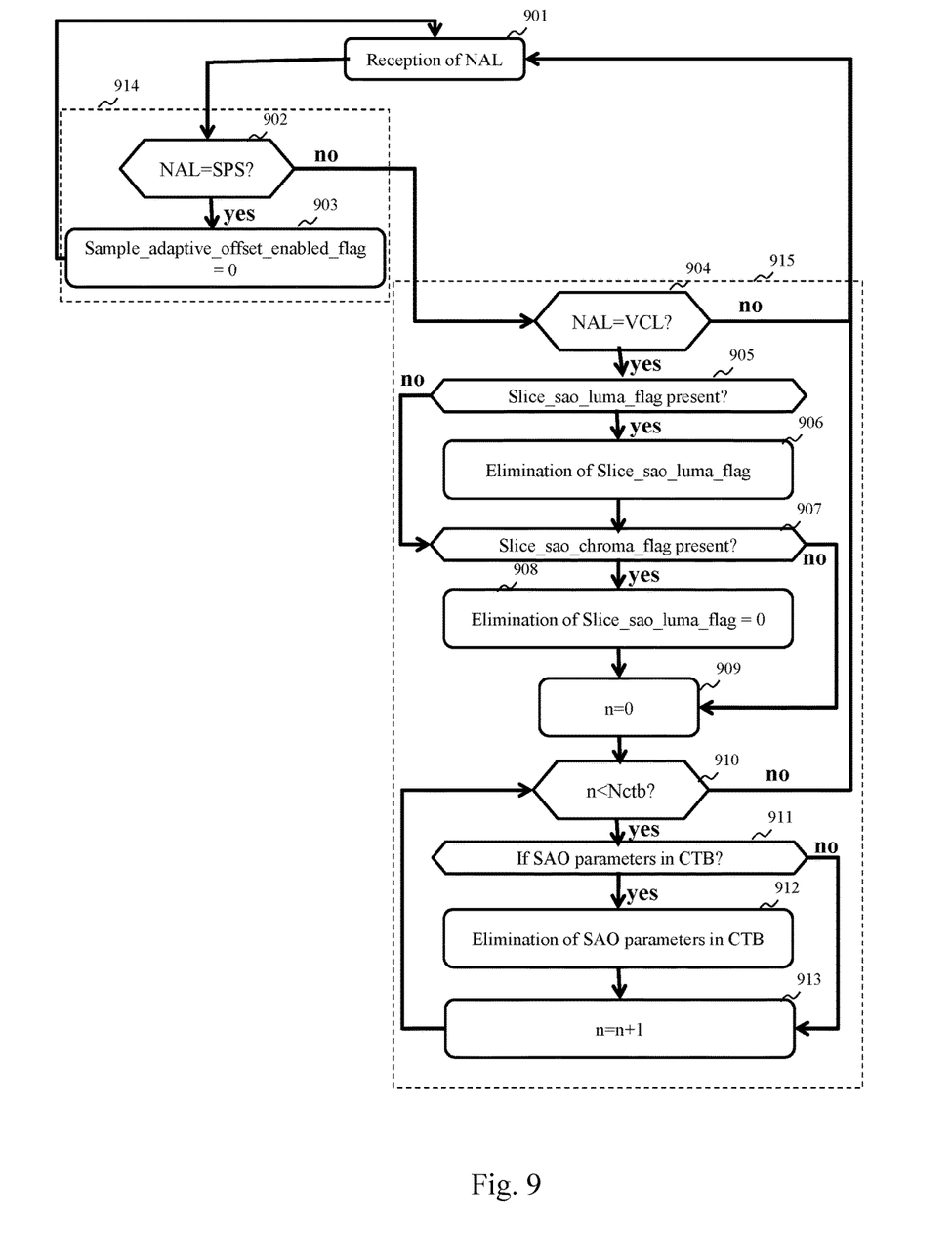
FIG. 9 depicts schematically an algorithm modifying a video stream and thus making it possible to obtain a reduction in the complexity of decoding of said video stream by preventing the use of a post-filtering method of the SAO filter type.

FIG. 9 details an algorithm used by the modification device 113 for transforming an HEVC container so as to deactivate the use of the SAO filtering during decoding. A first part 914 of the algorithm is then applied during the reception of an SPS container. This first part 914 makes it possible to ensure consistency of a syntax element of an SPS container relating to the SAO filtering with the deactivation of the SAO filtering. The first part 914 begins with the reception of a container during a step 901. The type of container received is next checked by the modification device 113 during a step 902. If the container is an SPS container, the modification device 113, in a step 903, forces to "0" the value of a syntax element Sample_adaptive_offset_enabled_flag indicating whether the SAO filtering must be implemented in the slices making reference to this SPS container. Following step 903, the modification device 113 awaits the reception of a new container. The reception of a new container causes return to step 901.

If the container is not an SPS container, the modification device 113 checks whether the container is a VCL container. If the container is not a VCL container, the modification device 113 awaits reception of a new container. The reception of a new container causes return to step 901.

If the container received is a VCL container, the modification device 113 applies a second part 915 of the algorithm. In this second part 915, the modification device 113 ensures consistency of syntax elements of a VCL container relating to the SAO filtering with the deactivation of the SAO filtering. The second part 915 begins with the search, during a step 905, for a syntax element Slice_sao_luma_flag indicating whether the SAO filtering is applied to the luminance component of the pixels in the slice contained in the container. If the syntax element Slice_sao_luma_flag is present, the modification device 113, during a step 906, eliminates the syntax element Slice_sao_luma_flag from the binary video stream portion corresponding to the container. Step 905 (or step 906 if the syntax element Slice_sao_luma_flag is present) is followed by a step 907.

During step 907, the modification device 113 seeks a syntax element Slice_sao_chroma_flag indicating whether the SAO filtering is applied to the chrominance components of the pixels in the slice contained in the container. If the syntax element Slice_sao_chroma_flag is present, the modification device 113, in a step 908, eliminates the syntax element Slice_sao_chroma_flag from the binary video stream portion corresponding to the container. Step 907 (or step 908 if the syntax element Slice_sao_chroma_flag is present) is followed by a step 909.

In another implementation of steps 906 and 908, the syntax elements Slice_sao_luma_flag and Slice_sao_chroma_flag are set to the value "0", The remainder of the algorithm makes it possible to run through all the CTBs contained in the slice corresponding to the VCL container. It is necessary in fact to check, for each CTB, whether the CTB contains syntax elements relating to the SAO filtering and where applicable eliminating these syntax elements. During step 909, a variable n used for running through all the CTBs of the slice is initialised to the value "0". During a step 910, the variable n is compared with the number Nctb of CTBs in the slice. If n is less than Nctb, the modification device 113 seeks syntax elements relating to the SAO filtering in the CTB. If the CTB contains no syntax element relating to the SAO filtering, the variable n is incremented by one unit and the algorithm returns to step 910. If the CTB contains syntax elements relating to the SAO filtering, these syntax elements are eliminated from the binary video stream portion corresponding to the CTB during a step 912. The elimination concerns for example the following syntax elements: sao_merge_left_flag, sao_merge_up_flag, sao_type_idx_luma, sao_type_idx_chroma, sao_offset_abs, sao_offset_sign, sao_band_position, sao_eo_class_luma, sao_eo_class_chroma. Step 912 is followed by step 913.

Up until now we have considered that the same display functionality was applied throughout a video stream. In another embodiment, the display functionality may be modified at any time during the display of a video stream. In this case, the PPS, SPS and VCL containers can be adapted at any moment according to requirements. The slices may make reference to SPS and PPS containers adapted to the functionality required by a user at a certain moment. The modification device 113 then gives, respectively to these SPS and PPS containers, SPS container indices and PPS container indices making it possible to differentiate them from the SPS and PPS containers present in the initial binary video stream before modification.

In addition, we have described the modification device 113 transforming containers corresponding to a single binary video stream. In another embodiment, the modification device 113 processes containers coming from different binary video streams and applies different transformations to these containers according to the display functionality sought. These various modified binary video streams are next decoded in parallel by the decoding device 114 and combined by the display device 115, for example, in order to overlay a low-resolution video in a high-resolution video or for displaying a video mosaic. The various binary video streams can moreover be encoded according to different standards, some being encoded according to the HEVC standard and other being encoded according to the H.264/AVC standard. In this embodiment, the decoding device 114 is able to decode binary video streams encoded according to the HEVC and H.264/AVC standards.

Figure 1B:
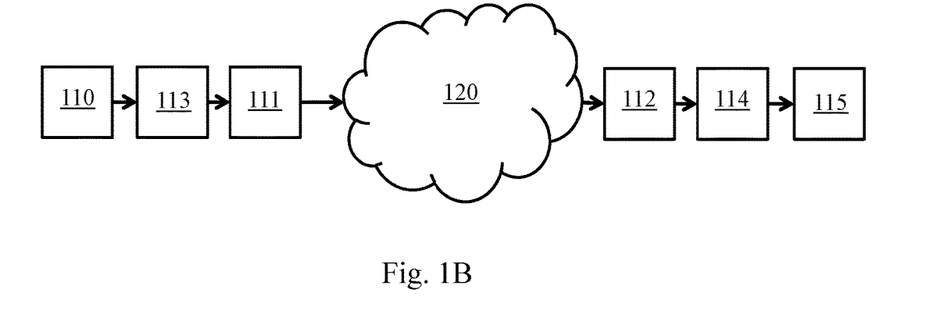
FIG. 1B depicts schematically a second video transmission system comprising a device implementing the invention.

Finally, in FIG. 1A, the modification device 113 is placed between the reception device 112 and the decoding device 114. In an alternative embodiment illustrated by FIG. 1B, the modification device may also be placed between the encoding device 110 and the transmission device 111. In this case, however, it is necessary to use a means for transmitting the display functionality requirements of the user to the modification device 113. It is possible for this to use RTSP (real-time streaming protocol) requests to indicate to the modification device 113 information representing the type of display functionality required by the user.

The invention claimed is:

1. A method for modifying a binary video stream encoded according to a video coding algorithm comprising a prediction loop and an in-loop post-filtering integrated in the prediction loop, wherein a device performs:
    receiving a first binary video stream from an encoding device;
    receiving information representing a reduction in decoding complexity by means of a communication network;
    seeking a syntax element relating to the in-loop post-filtering in the first binary video stream, the syntax element being used by a decoding device for controlling a complexity of implementation of the in-loop post-filtering;
    generating a second binary video stream by modifying a value of the syntax element in the first binary video stream or eliminating the syntax element from the first binary video stream so as to obtain a reduction in the complexity of execution of the in-loop post-filtering by the decoding device on the second binary video stream comparing to the first binary video stream; and
    transmitting, to a transmission device, the second binary video stream resulting from the modification in order to transmit the second binary video stream over the communication network.

2. The method according to claim 1, wherein the in-loop post-filtering comprises a deblocking filtering and/or an SAO filtering.

3. The method according to claim 2, wherein, the deblocking filtering attenuating discontinuities between blocks of pixels and comprising a first filtering and a second filtering, the first filtering attenuating the discontinuities between the blocks of pixels more strongly than the second filtering, the first filtering having greater complexity than the second filtering, when the value of the syntax element has been modified and the syntax element relates to the deblocking filtering, said value is modified so as to favour use by the decoding device of the second filtering compared with the first filtering.

4. The method according to claim 2, wherein, when the value of the syntax element has been modified and the syntax element relates to deblocking filtering or relates to SAO filtering, the modification of the value of the syntax element makes it possible to deactivate respectively the implementation of the deblocking filtering or the implementation of the SAO filtering by the decoding device.

5. The method according to claim 2, wherein, when the syntax element is eliminated and the syntax element relates to deblocking filtering or relates to an SAO filtering, the elimination of the syntax element makes it possible to deactivate respectively the implementation of the deblocking filtering or the implementation of the SAO filtering by the decoding device.

6. The method according to claim 1, wherein the value of the modified syntax element and/or the eliminated syntax element are dependent on information representing a reduction in decoding complexity.

7. The method according to claim 6, wherein reduction in the decoding complexity is dependent on a display functionality required by a user for display, on a display device, of images corresponding to the binary video stream.

8. The method according to claim 1, wherein said video coding algorithm is based on the H.264/AVC standard or on the HEVC standard.

9. A device for modifying a binary video stream encoded according to a video coding algorithm comprising a prediction loop and an in-loop post-filtering integrated in the prediction loop, wherein the device comprises electronic circuitry adapted for:
receiving a first binary video stream from an encoding device;
receiving information representing a reduction in decoding complexity by means of a communication network;
seeking in the first binary video stream a syntax element relating to the in-loop post-filtering, the syntax element being used by a decoding device for controlling the complexity of implementation of the in-loop post-filtering;
generating a second video stream by modifying a value of the syntax element in the first binary video stream and/or by eliminating the syntax element from the binary video stream so as to obtain a reduction in the complexity of execution of the in-loop post-filtering by the decoding device on the second binary video stream comparing to the first binary video stream; and
transmitting, to a transmission device, the second binary video stream resulting from the modification in order to transmit the second binary video stream over the communication network.

10. A system for communicating a binary video stream with a view to display by a display device, the binary video stream having been encoded according to a video coding algorithm comprising a prediction loop and an in-loop post-filtering integrated in the prediction loop, the system comprising a decoding device able to decode the binary video stream and able to transmit to the display device images corresponding to a result of the decoding of the binary video stream, wherein the system comprises a device for modifying a binary video stream according to claim 9, the modification device being able to supply to the decoding device a modified binary video stream resulting from the modification of the binary video stream by the modification device.

11. A non transitory information storage medium, storing a computer program comprising program code instructions which can be loaded in a programmable device to cause said programmable device to implement the method according to claim 1, when the program code instructions are run by the programmable device.

\* \* \* \* \*